United States Patent [19]

Aizawa

[11] Patent Number: 5,293,361
[45] Date of Patent: Mar. 8, 1994

[54] INFORMATION PROCESSING METHOD AND APPARATUS THEREFOR IN WHICH AN ERASING DEVICE IS DRIVEN FOR A PERIOD LONGER THAN A NECESSARY PERIOD

[75] Inventor: Takayuki Aizawa, Yokohama, Japan

[73] Assignee: Canon Kabushiki Kaisha, Tokyo, Japan

[21] Appl. No.: 960,271

[22] Filed: Oct. 13, 1992

Related U.S. Application Data

[63] Continuation of Ser. No. 671,648, Mar. 20, 1991, abandoned, which is a continuation of Ser. No. 104,066, Oct. 5, 1987, abandoned.

[30] Foreign Application Priority Data

Oct. 8, 1986 [JP] Japan ................... 61-238018

[51] Int. Cl.$^5$ .............. G11B 13/04; G11B 11/12; G11B 11/10
[52] U.S. Cl. .................. 369/13; 369/100; 360/114; 360/59
[58] Field of Search .......... 369/13, 14, 100, 54, 369/58; 360/59, 114; 365/122

[56] References Cited

U.S. PATENT DOCUMENTS

| | | | |
|---|---|---|---|
| 4,495,530 | 1/1985 | Yanagida | 369/13 |
| 4,674,071 | 6/1987 | Okumura et al. | 369/48 |
| 4,733,385 | 3/1988 | Henmi et al. | 369/13 |
| 4,953,150 | 8/1990 | Sonobe | 369/13 |

FOREIGN PATENT DOCUMENTS

| | | | |
|---|---|---|---|
| 0218243 | 4/1987 | European Pat. Off. | |
| 3434418 | 3/1985 | Fed. Rep. of Germany | |
| 58-70402 | 4/1983 | Japan | |
| 58-83347 | 5/1983 | Japan | 369/13 |
| 60-32166 | 2/1985 | Japan | |
| 60-193107 | 10/1985 | Japan | |
| 60-258733 | 12/1985 | Japan | 369/100 |
| 61-206926 | 9/1986 | Japan | 369/13 |

Primary Examiner—Hoa T. Nguyen
Attorney, Agent, or Firm—Fitzpatrick, Cella, Harper & Scinto

[57] ABSTRACT

An information processing method for scanning, by an erasing device, a recording medium on which information is recorded in a predetermined area and erasing the recorded information is disclosed. The erasing device is driven for a period, including the period during which the erasing device is on the area, and longer than the period. The specification also discloses an information processing apparatus including a recording/erasing device for applying a light beam to an optical recording medium and selectively effecting recording and erasing of information, a scanning device for scanning the light beam relative to the recording medium, and a control arrangement for controlling the application time of the light beam so that during erasing, the light beam is applied to an area larger than the area of the recording medium in which information is recorded.

5 Claims, 6 Drawing Sheets

INFORMATION PROCESSING METHOD AND APPARATUS THEREFOR IN WHICH AN ERASING DEVICE IS DRIVEN FOR A PERIOD LONGER THAN A NECESSARY PERIOD

This application is a continuation of prior application, Ser. No. 07/671,648 filed Mar. 20, 1991, which application is a continuation of prior application, Ser. No. 07/104,066 filed Oct. 5, 1987, both now abandoned.

BACKGROUND OF THE INVENTION

1. Field of the Invention

The present invention relates to an information processing method for erasing information recorded on an erasable recording medium and to an apparatus therefor.

2. Related Background Art

A magneto-optical recording medium 52 whose cross-section is schematically shown, for example, in FIG. 1A of the accompanying drawings is known as an erasable recording medium. This magneto-optical recording medium has as a recording layer 53 of a magnetic film whose readily magnetizable axis is perpendicular to the film surface. Recording of information may be accomplished by arranging the directions of magnetization of the recording layer 53 in a first direction in advance, and scanning the recording layer by a light beam 54 intensity-modulated in conformity with the information while extraneously applying a magnetic field $M_R$ in the direction opposite to the first direction. The portion of the recording layer to which the light beam is applied is once demagnetized, thereby, and is subsequently magnetized in a direction to opposite to the first direction by an extraneous magnetic field and forms a recording bit 55 corresponding to the information as shown in FIG. 1B of the accompanying drawings. The thus recorded information may be read out in a well-known manner using the magneto-optical effect by applying an unmodulated light beam of low intensity to the recording layer and detecting the light reflected by or transmitted through the recording layer. When the recorded information is to be erased, a light beam 56 is applied to the area in which the information is recorded while an extraneous magnetic field $M_E$ in the direction opposite to the direction of magnetic field $M_R$ (i.e., the direction in which the recording layer was magnetized before recording) is applied to the recording layer as shown in FIG. 1C of the accompanying drawings.

To accomplish reliable erasing without leaving any unerased portion when the information is to be erased as described above, it is necessary that the erasing light beam accurately scan the area in which the information is recorded. So, in U.S. Pat. No. 4,953,150 (same assignee) it is proposed to, increase the power of the light beam during erasing from that used in recording. This is a technique for reliably accomplishing erasing even if more or less deviation of the scanning region is caused in a direction perpendicular to the direction in which the recording bit row continues (the so-called tracking direction) by making the erasing range by the light beam larger than the width of the recording bit. However, although the error in the tracking direction is allowable in the above-described technique, such a technique has still been insufficient when the error in the beam scanning direction is taken into consideration. This will be described hereinafter.

As shown in the schematic plan view of FIG. 2A of the accompanying drawings, a magneto-optical recording medium is generally divided into predetermined units called sectors. Each sector, in turn, is divided into an address area and a recording area, and a gap portion is provided therebetween. In the address area, an address number, or the like, indicative of the position of that sector on the medium is pre-recorded by an unerasable bit 58 formed by the unevenness, or the like, of the medium substrate. In the recording area, the recording bit 57 is magnetically recorded by the aforedescribed method. Also, this sector is separated from the next sector by a sector gap.

Here, when the recording bit 57 is to be erased, the recording area may be scanned by an erasing light beam spot 59 as shown in FIG. 2B. However, if the light beam is turned-on too late or turned-off too early due to the error of the timing count for turning on and turning off the light beam and due to the irregularity of the beam scanning speed, unerased portions 60 of the recording bit are caused as shown in FIG. 2C of the accompanying drawings. Such unerased portions 60 have caused a reduction in the reliability of recording when information is re-recorded in this area.

SUMMARY OF THE INVENTION

It is the object of the present invention to overcome the above-noted disadvantage of the prior art and to provide an information processing method capable of reliably erasing information recorded on a recording medium and an apparatus therefor.

The above object of the present invention is achieved by driving, in an information processing method for scanning by erasing means, a recording medium on which information is recorded in a predetermined area and erasing the recorded information, the erasing means being operable for a period which is longer than the period during which the erasing means is on the area to be erased.

Also, an information processing apparatus according to the present invention comprises recording erasing means for applying a light beam to an optical recording medium and selectively effecting recording and erasing of information, scanning means for scanning the light beam relative to the recording medium, and control means for controlling the application time of the light beam so that during erasing, the light beam is applied to an area larger than the area of the recording medium in which information is recorded.

DESCRIPTION OF THE PREFERRED EMBODIMENTS

An embodiment of the present invention will hereinafter be described in detail with reference to the drawings.

Figure 1A:
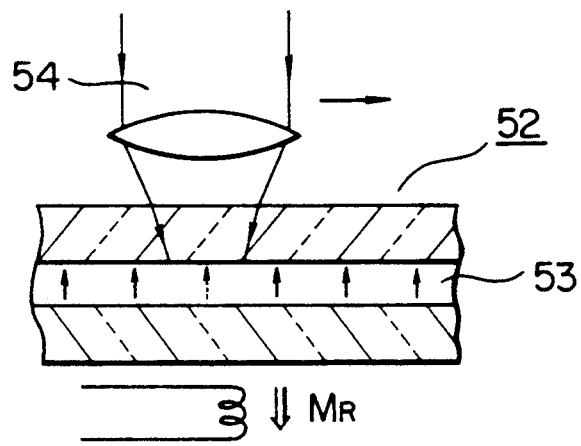
FIGS. 1A-1C are schematic cross-sectional views illustrating the process in which information is recorded on a magneto-optical recording medium and in which the recorded information is erased.
Figure 1B:
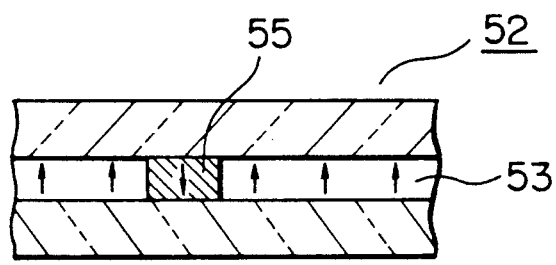
Figure 1C:
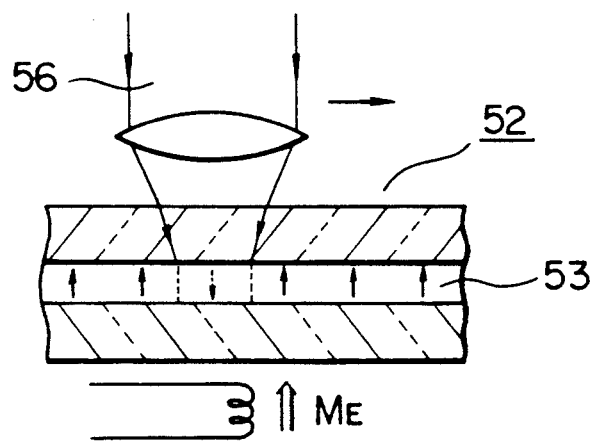
Figure 2A:
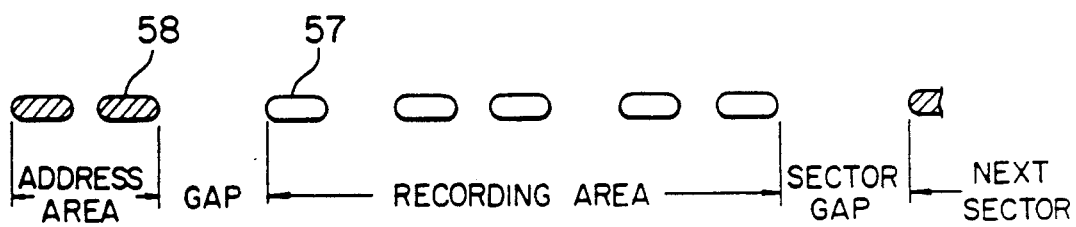
FIGS. 2A-2C are schematic plan views showing the process in which information recorded on a magneto-optical recording medium is erased.
Figure 2B:
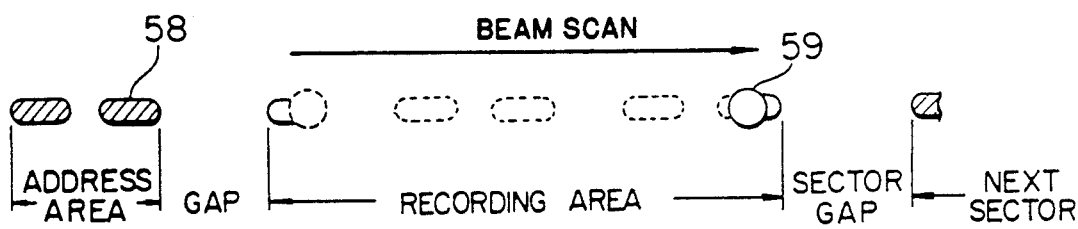
Figure 2C:
Figure 3:
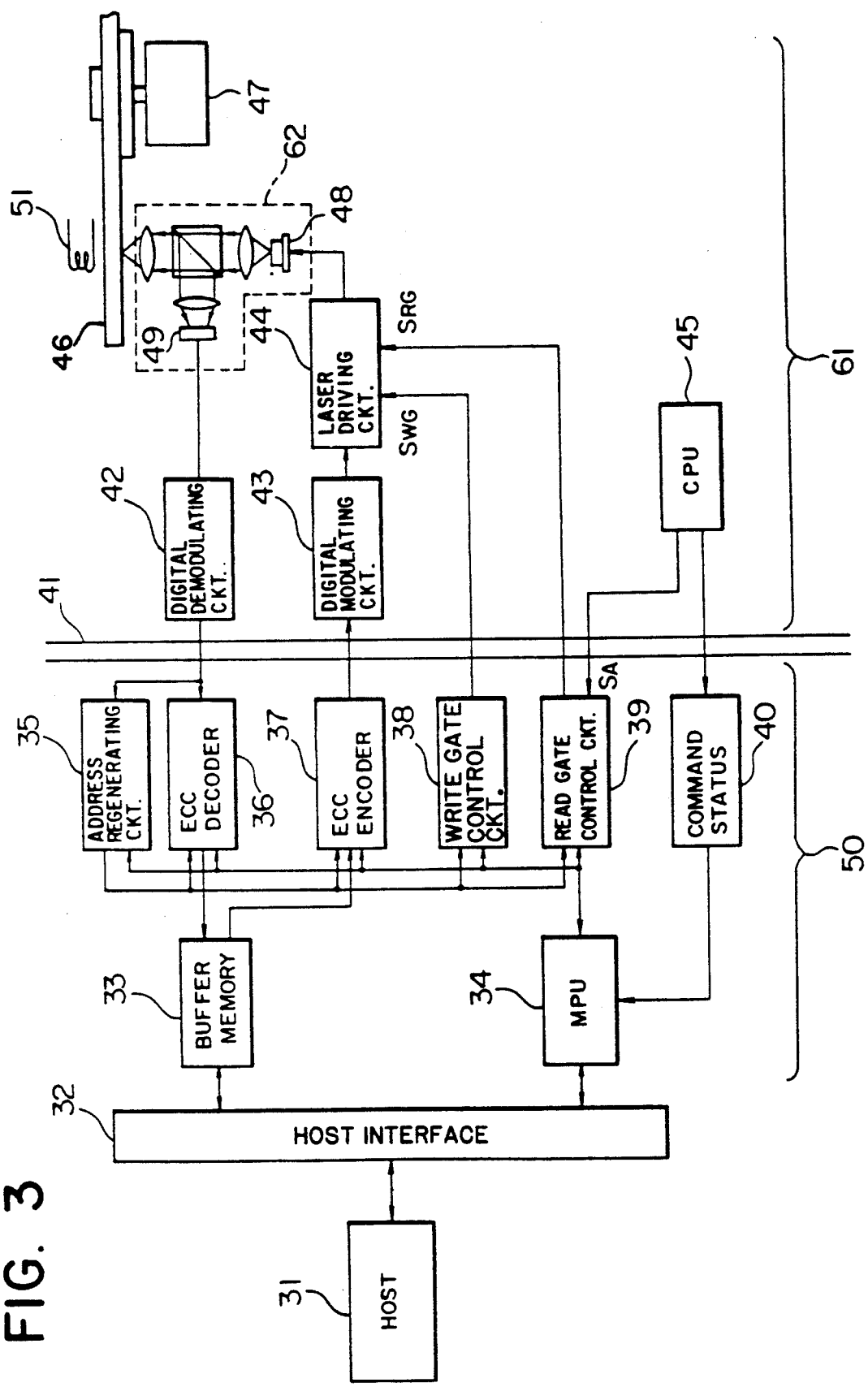
FIG. 3 is block diagram showing an embodiment of the information processing apparatus of the present invention.

FIG. 3 is a block diagram showing an embodiment of the present invention applied to a magneto-optical information recording apparatus. In FIG. 3, reference numeral 31 designates a host computer, reference numeral 61 denotes a disk drive, reference numeral 50 designates a controller for controlling the operation of the drive 61, reference numeral 32 denotes a host interface connecting the host computer 31 to the controller 50, and reference numeral 41 designates a drive interface connecting the drive 61 to the controller 50. A magneto-optical disk 46 is mounted in the drive 61 and may be rotated by a spindle motor 47. A light beam is applied to the rotated disk 46 from an optical head 62, whereby recording, reproduction and erasing of information are effected. The optical head 62 includes a semiconductor laser 48 which is a light source, an optical system for condensing the light beam emitted from the semiconductor laser onto the disk, and a photodetector 49 for detecting the reflected light from the disk. The drive 61 has a digital demodulating circuit 42, a digital modulating circuit 43, a laser driving circuit 44, a drive side central processing unit (CPU) 45 and an extraneous magnetic field applying means 51. The controller 50 contains therein a buffer memory 33, a microprocessing unit (MPU) 34, an address regenerating circuit 35, an error correction code (ECC) decoder 36, an ECC encoder 37, a write gate control circuit 38, a read gate control circuit 39 and a command status 40.

The operation of this apparatus will now be described.

During recording, an instruction to commence recording of information is supplied from the CPU 45 to the MPU 34 through the command status 40. When an allow signal $S_A$ is input from the CPU 45, a read gate signal $S_{RG}$ is supplied from the read gate control circuit 39 to the laser driving circuit 44. The semiconductor laser 48 continuously emits a light at the read mode, i.e., at a low intensity, and the light beam is scanned on the disk 46. The reflected light from the disk 46 is detected by the photodetector 49, and the detection signal is input to the address regenerating circuit 35 through the digital demodulating circuit 42. The address number recorded on the disk 46 is regenerated by the address regenerating circuit 35. When the regenerated address number coincides with the address number of a desired sector designated by the MPU 34, an enable signal is output from the address regenerating circuit 35 to the write gate control circuit 38. A write gate signal $S_{WG}$ corresponding to the recording area on the disk 46 is output from the write gate control circuit 38 to the laser driving circuit 44. The recorded information is once stored from the host computer 31 into the buffer memory 33 through the host interface 32. A recording signal is input to the laser driving circuit 44 through the ECC encoder 37 and the digital demodulating circuit 43. When the write gate signal is in its ON state, the semiconductor laser is turned on and off in response to the information signal and information is recorded on the disk 46.

When the thus recorded information is to be erased, an operation similar to that described above is performed until an enable signal is output from the address regenerating circuit 35. However, an instruction of the erasing mode is provided from the MPU 34 to the write gate control circuit 38 thereby producing a gate signal which is longer than the signal produced during recording. The laser driving circuit causes the semiconductor laser to emit light for the period of time during which the gate signal is in the ON state. Therefore, the light beam is scanned over an area longitudinally longer than the recording area, i.e., an area from a gap to a sector gap. Accordingly, even if more or less error occurs in the scanning direction, erasing of information can be reliably accomplished.

Figure 4:
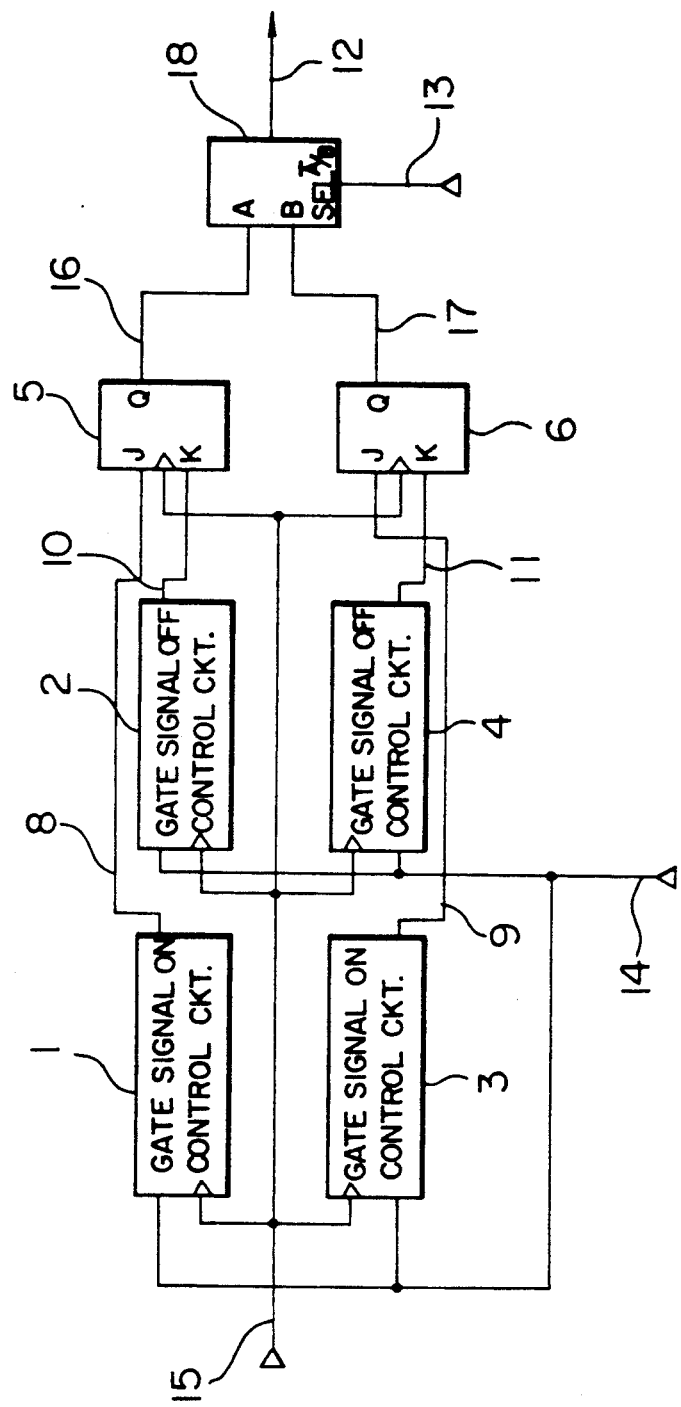
FIG. 4 is a block diagram showing an example of the construction of a write gate control circuit in the apparatus shown in FIG. 3.

A specific example of the construction of the write gate control circuit 38 is shown in FIG. 4. In FIG. 4, reference numerals 1 and 3 designate gate signal ON control circuits, and reference numerals 2 and 4 denote gate signal OFF control circuits. These control circuits are each comprised of a counter and a plurality of transistor logics (TTL), and are designed to output a pulse corresponding to one clock and stop when the count of the counter reaches a predetermined value. Reference numerals 5 and 6 designate latches, and reference numerals 8, 9, 10 and 11 denote the output lines from the respective control circuits. Reference numeral 12 designates a gate signal, reference numeral 13 denotes a circuit selecting control signal input from the MPU 34, reference numeral 14 designates a counter operating enable signal input from the address regenerating circuit, reference numeral 15 denotes a clock signal input from an internal clock signal generator, not shown, and reference numeral 18 designates a multiplexer.

The operation of the circuit shown in FIG. 4 will hereinafter be described. Let it be assumed that the control circuits 1 and 2 are for data recording and the control circuits 3 and 4 are for data erasing.

Figure 5A:
FIGS. 5A-5F are timing charts showing the output signals of various portions of the circuit shown in FIG. 4.
Figure 5B:
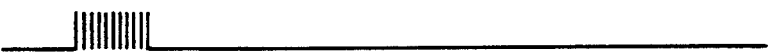
Figure 5C:
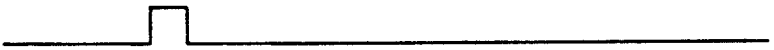
Figure 5D:
Figure 5E:
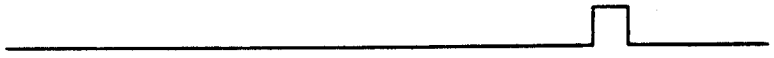
Figure 5F:

During data recording, the multiplexer 18 selects a terminal A in response to the control signal 13 from the MPU 34 so that the gate signal 12 is controlled by the control circuits 1 and 2. When in this state, the enable signal 14 input from the address regenerating circuit 35 becomes active as shown in FIG. 5A, the counters in the control circuits 1 and 2 start to count the clock signal 15 as shown in FIGS. 5B and 5D. Here, the set value of the counter in the control circuit 1 is made smaller than the set value of the counter in the control circuit 2. When the count value of the counter in the control circuit 1 becomes equal to the set value, a coincidence pulse as shown in FIG. 5C is output to the line 8 and latched by the latch 5, and the output 16 shown in FIG. 5F becomes active. The set value of the counter in the control circuit 2 is greater than the set value of the counter in the control circuit 1 and therefore, after the coincidence pulse of FIG. 5C has been output, the count value of the counter in the control circuit 2 becomes equal to the set value and the coincidence pulse shown in FIG. 5E is output to the line 10. The output 16 is reset by the latch 5 as shown in FIG. 5F. Since the multiplexer 18 selects the terminal A, the output 16 is intactly input as a gate signal 12 to the aforementioned laser driving circuit 44. If the rising of the enable signal 14 is brought into coincidence with the detection of the termination of the address area on the recording medium shown in FIG. 6 and the set value of the counter in the control circuit is brought into coincidence with the period during which the light beam crosses the gap portion and the set value of the counter in the control circuit 2 is brought into coincidence with the period during which the light beam crosses the gap portion and the data recording area, the gate signal 12 assumes the gate timing during recording shown in FIG. 6.

Figure 6:
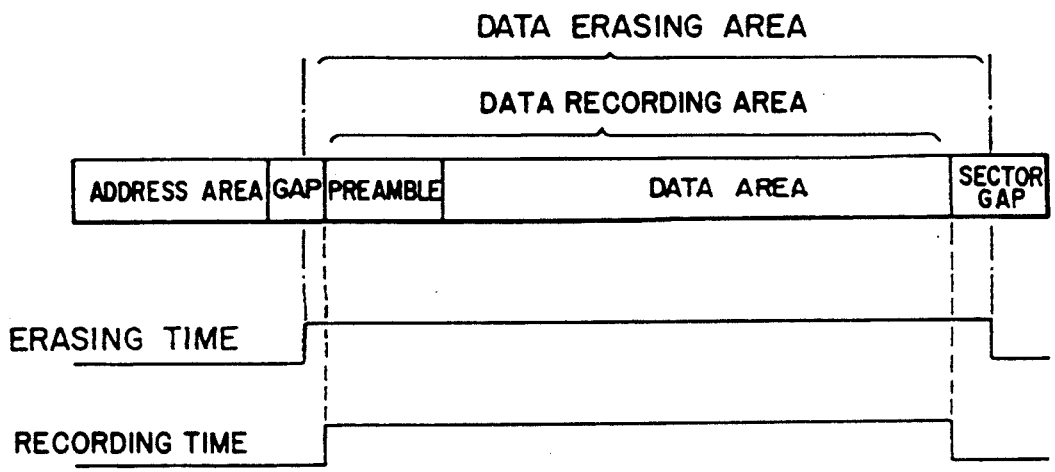
FIG. 6 schematically shows the application period of a light beam based on the method of the present invention.

During data erasing, the multiplexer 18 selects a terminal B in response to the control signal 13 from the MPU 34 and change-over is made so that the gate signal 12 is controlled by the control circuits 3 and 4. When in this state, the enable signal 14 input from the address regenerating circuit 35 becomes active, the counters in the control circuits 3 and 4 start to count the clock signal 15 as during recording. Here, the set value of the counter in the control circuit 3 is made smaller than the set value of the counter in the control circuit 4. When the count value of the counter in the control circuit 3 becomes equal to the set value, a coincidence pulse is output to the line 9 and is latched by the latch 6, and the output 17 becomes active. The set value of the counter in the control circuit 4 is greater than the set value of the counter in the control circuit 3 and therefore, after a coincidence pulse has been output to the line 9, the count value of the counter in the control circuit 4 becomes equal to the set value and a coincidence pulse is output to the line 11. The output 17 is reset by the latch 6. Since the multiplexer 18 selects the terminal B, the output 17 is input as a gate signal 12 to the aforementioned laser driving circuit 44. If, as during recording, the rising of the enable signal 14 is brought into coincidence with the detection of the termination of the address area on the recording medium shown in FIG. 6 and the set value of the counter in the control circuit 3 is set so that a coincidence pulse is output intermediate the gap portion and the set value of the counter in the control circuit 4 is set so that a coincidence pulse is output in the sector gap succeeding the data recording area, the gate timing during erasing shown in FIG. 6 is obtained. The driving of the semiconductor laser 44 in FIG. 3 is effected in accordance with these gate timings. Thus, during erasing, the light beam scans a larger area than during recording, and reliable erasing of information becomes possible, as previously described.

Figure 7:
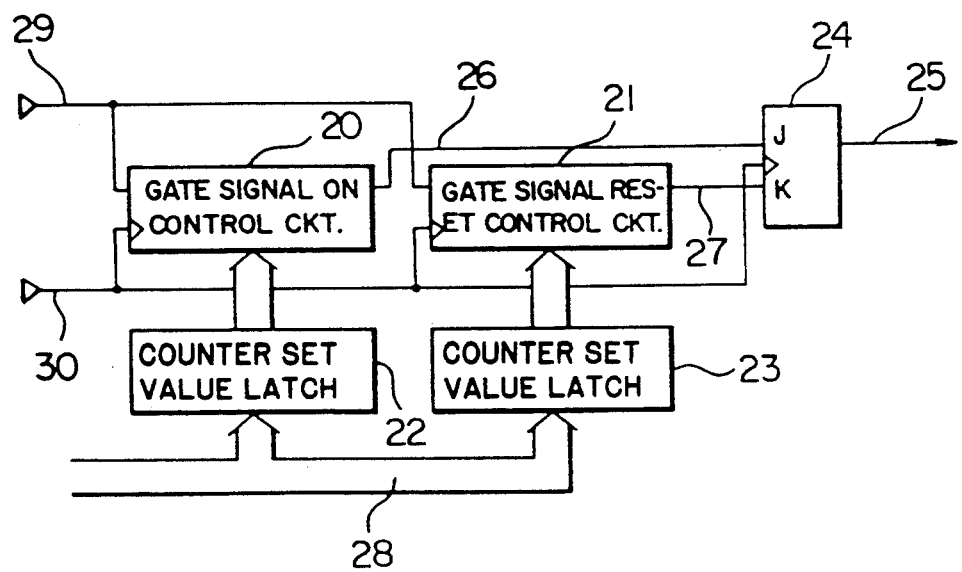
FIG. 7 is a block diagram showing another example of the construction of the write gate control circuit in the apparatus shown in FIG. 3.

FIG. 7 is a block diagram showing another example of the construction of the write gate control circuit in the apparatus shown in FIG. 3. In the example shown in FIG. 4, discrete circuits are provided to vary the allowed laser turn-on period by the gate signal between the recording time and the erasing time, whereas in the present example, control of the gate signal is effected by one kind of control circuit. In FIG. 7, reference numeral 20 designates a gate signal ON control circuit, reference numeral 21 denotes a gate signal reset control circuit, reference numerals 22 and 23 designate latches for setting the counters in the control circuits, reference numeral 24 denotes a gate signal outputting latch, reference numeral 25 designates a gate signal, reference numerals 26 and 27 denote the output lines from the respective control circuits, reference numeral 28 designates the MPU bus from the MPU, reference numeral 29 denotes the enable signal from the address regenerating circuit, and reference numeral 30 designates the clock signal from an internal clock signal generator, not shown.

During data recording, a set value is latched by the latch 22 such that the coincidence pulse of the control circuit 20 is output from the MPU bus 28 to the line 26 by the MPU 34 upon termination of the gap of FIG. 6. Also, a set value is latched by the latch 23 such that the coincidence pulse of the control circuit 21 is output upon termination of the recording area.

Likewise, during erasing, a set value is latched by the latch 22 such that the coincidence pulse of the control circuit 20 is output intermediate the gap portion of FIG. 6, and preparation is made such that the coincidence pulse of the control circuit 21 is output to the latch 23 intermediate the sector gap following to the recording area. As described above, by changing the set values of the counters in the control circuits by the MPU between the recording time and the erasing time, there is obtained the timing of the gate signal of FIG. 6 similar to that described previously.

In addition to the above-described embodiment, various modifications and applications of the present invention are conceivable. For example, in the above-described embodiment, counters are used as means for changing the timing during information recording and during erasing, but alternatively, a high-speed sequencer may be used. The present invention is applicable not only to a magneto optical recording apparatus, but also to other apparatuses for effecting recording and erasing of information. The present invention covers all such modifications and applications without departing from the scope thereof as defined in the appended claims.

What is claimed is:

1. A method for recording information on a magneto-optical information recording medium that includes a sector having a recording area and a defined front gap portion and a defined rear gap portion respectively located before and after the recording area on the medium, and for erasing recorded information, by using an information processing apparatus that includes irradiating means for irradiating the recording medium with a light beam and applying means for applying a magnetic field to the recording medium, said method comprising the steps of:

recording information on the recording medium by scanningly irradiating the recording area of the sector of the medium with the light beam while applying a magnetic field to the medium in a predetermined direction, said recording step comprising intensity modulating the light beam according to recording information solely during an interval in which the light beam irradiates the recording area; and erasing recorded information by scanningly irradiating the sector of the recording medium with the light beam used for recording, while applying a magnetic field to the medium in a direction opposite to the predetermined direction, said erasing step comprising (i) irradiating the front gap portion of the medium with the light beam at a predetermined intensity level sufficient to completely erase recorded information, (ii) continuing to irradiate the medium with the light beam at the predetermined intensity during an entire interval in which the light beam scans the front gap portion, passes through the recording area and into the rear gap portion, and (iii) stopping irradiation of the recording medium at the predetermined intensity when the light beam is in the rear gap portion, to completely erase recorded information even if errors occur in on and off timing of the light beam.

2. An information processing apparatus according to claim 1, wherein said gate control circuit comprises two circuits for generating the first and second gate signals of different lengths, and switching means for selectively inputting the outputs of said two circuits to said driving circuit.

3. An information processing apparatus according to claim 1, wherein said gate control circuit comprises a circuit, including a counter, for generating a gate signal of a length corresponding to a set value of said counter, and means for changing the set value of said counter between the recording time and the erasing time.

4. An information processing apparatus according to claim 1, wherein the recording medium comprises an magneto-optical disk and said moving means is a spindle motor for rotating the magneto-optical disk.

5. An apparatus for selectively effecting recording of information on and erasing of recorded information from a magneto-optical recording medium that includes a sector having a recording area and a defined front gap portion and a defined rear gap portion respectively located before and after the recording area on the medium, said apparatus comprising:

a light source for emitting a light beam to irradiate the recording medium;

moving means for relatively moving the light beam and the recording medium to scanningly irradiate the sector of the medium with the light beam;

applying means for selectively applying a magnetic field to the medium in a predetermined direction and in a direction opposite to the predetermined direction;

a driving circuit for driving said light source and for intensity modulating the light beam emitted from said light source;

a modulation circuit for supplying to said driving circuit a signal modulated according to recording information; and a gate control circuit for selectively supplying to said driving circuit a first gate signal during information recording and a second gate signal during information erasing, respectively, the first gate signal having a length corresponding to an interval during which the light beam scanningly irradiates the recording area of the recording medium and the second gate signal being longer than the first gate signal, wherein said driving circuit intensity-modulates the light beam according to the signal supplied from said modulation circuit during an interval in which the first gate signal is supplied to said driving circuit from said gate control circuit, the second gate signal having a length corresponding to an entire interval during which the light beam, at a predetermined intensity level sufficient to completely erase recorded information, scanningly irradiates the medium from the front gap portion, through the recording area and into the rear gap portion, and said driving circuit causes said light source to emit the light beam to irradiate the recording medium at the predetermined intensity during the entire interval in which the second gate signal is supplied to said driving circuit from said gate control circuit, to completely erase recorded information even if errors occur in on and off timing of the light beam.

* * * * *

UNITED STATES PATENT AND TRADEMARK OFFICE
CERTIFICATE OF CORRECTION

PATENT NO. : 5,293,361
DATED : March 8, 1994
INVENTOR(S) : Takayuki AIZAWA

It is certified that error appears in the above-indentified patent and that said Letters Patent is hereby corrected as shown below:

ON THE COVER PAGE:

IN THE ABSTRACT:

Line 6, "period, including the period during which" should read --first period, including a second period during which--; and
Line 7, "and longer than the" should read --the first period being longer than the second--.

COLUMN 1:

Line 34, "to" (first occurrence) should be deleted.

COLUMN 6:

Line 11, "to" should be deleted;
Line 24, "magneto optical" should read --magneto-optical--; and
Line 47, "intensity modulating" should read --intensity-modulating--.

UNITED STATES PATENT AND TRADEMARK OFFICE
CERTIFICATE OF CORRECTION

PATENT NO.   : 5,293,361
DATED        : March 8, 1994
INVENTOR(S)  : Takayuki AIZAWA It is certified that error appears in the above-indentified patent and that said Letters Patent is hereby corrected as shown below:

COLUMN 7:

Line 15, "an" should read --a--; and
    Line 16, "is" should read --comprises--.

Signed and Sealed this

Thirtieth Day of August, 1994

Attest:

BRUCE LEHMAN

Attesting Officer    Commissioner of Patents and Trademarks